United States Patent
Ishigaki

[11] Patent Number: 5,927,334
[45] Date of Patent: *Jul. 27, 1999

[54] THREE-PORT VALVE

[75] Inventor: Tsuneo Ishigaki, Yawara-mura, Japan

[73] Assignee: SMC Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/781,622

[22] Filed: Jan. 9, 1997

[30] Foreign Application Priority Data

Jan. 11, 1996 [JP] Japan .................................. 8-019248

[51] Int. Cl.⁶ .................................................. F16K 11/14
[52] U.S. Cl. ................................... 137/627.5; 137/596.17
[58] Field of Search ............................ 137/596.17, 627.5

[56] References Cited

U.S. PATENT DOCUMENTS

| | | | |
|---|---|---|---|
| 2,969,811 | 1/1961 | Freeman | 137/627.5 |
| 3,043,336 | 7/1962 | Parent et al. | 137/596.17 X |
| 3,357,454 | 12/1967 | Koutnik | 137/627.5 |
| 3,461,913 | 8/1969 | Scott | 137/627.5 |
| 3,605,813 | 9/1971 | Nakano et al. | 137/627.5 |
| 3,921,666 | 11/1975 | Leiber | 137/627.5 X |
| 3,989,063 | 11/1976 | Brouwers et al. | 137/627.5 X |
| 4,494,559 | 1/1985 | Kawamura | 137/627.5 X |
| 4,526,203 | 7/1985 | Leiber | 137/627.5 |
| 4,922,966 | 5/1990 | Kaes et al. | 137/627.5 |
| 5,207,245 | 5/1993 | Maranzano | 137/625.65 |
| 5,567,023 | 10/1996 | Yoo | 137/596.17 X |

Primary Examiner—Gerald A. Michalsky
Attorney, Agent, or Firm—Baker & Botts, L.L.P.

[57] ABSTRACT

A three-port valve capable of switching flow paths from one to another without undesired communication between the switched flow paths. A first valve seat (55) and a second valve seat (56) are disposed opposite to each other in a central valve chamber (42). A first passage (49) extending through the first valve seat (55) is communicated with a first port (45). A second passage (51) extending through the second valve seat (56) is communicated with a second port (47). The central valve chamber (42) is communicated with a third port (46). A valve body having a first seal surface (76) and a second seal surface (77) is disposed between the first valve seat (55) and the second valve seat (56). The distance between the first and second seal surfaces (76 and 77) of the valve body is variable. At least one of the seal surfaces (76 and 77) of the valve body is always placed in close contact with the first valve seat (55) or the second valve seat (56). At a stage in a switching operation of the valve, both the two seal surfaces (76 and 77) of the valve body are placed in close contact with the first and second valve seats (55 and 56), respectively.

5 Claims, 4 Drawing Sheets

THREE-PORT VALVE

BACKGROUND OF THE INVENTION

The present invention relates to a three-port valve used to switch between various fluids, for example, to switch between a vacuum pump, a vacuum chamber, and the atmosphere.

FIG. 4 shows a conventional three-port valve (more specifically, a three-port solenoid valve). The three-port valve has a body part 11 and a solenoid part 12. The body part 11 and the solenoid part 12 are connected together through an annular spacer 13. A retainer 14 is secured to the bottom of the body part 11. The solenoid part 12 has a fixed iron core 16 at the upper end thereof. In a top plan view, the fixed iron core 16 lies in the center of the solenoid part 12. A guide cylinder 17 is connected to the outer surface of the fixed iron core 16 and extends downward. A pair of upper and lower magnetic flange members 18 and 19 and a bobbin 20 are connected to the outer periphery of the guide cylinder 17. A solenoid 21 is fitted on the bobbin 20. The outer peripheries of the solenoid 21 and bobbin 20 are protected by cover members 22 and 23 and frame members 24 and 25. The outer sides of the frame members 24 and 25 are secured by a body 26 made of a synthetic resin material. The frame members 24 and 25 and the annular spacer 13 are connected together through a coned disc spring 27. The lower end portion of the guide cylinder 17 is engaged with the lower end portion of the spacer 13. A plate member 28, together with a snap ring 29, is engaged in an upper annular groove provided in the upper end portion of the fixed iron core 16, thereby positioning the synthetic resin body 26.

The body part 11 includes a body member 32. The body member 32 has an upper cylindrical portion 33 projecting upward. A cylindrical portion 34 projects from one side (left-hand side as viewed in FIG. 4) of the body member 32. The cylindrical portion 34 will be hereinafter referred to as "left cylindrical portion 34". A cylindrical portion 35 projects from the other side (right-hand side as viewed in FIG. 4) of the body member 32. The cylindrical portion 35 will be hereinafter referred to as "right cylindrical portion 35". The body member 32 further has therein a second port block 37 provided with a second port 47. The upper cylindrical portion 33, the left cylindrical portion 34, the right cylindrical portion 35, and the second port block 37 are integrally formed as one unit. A central bore 39 vertically extends through the central portion of the body member 32. The second port block 37 lies across the central bore 39. The upper end of the central bore 39 is communicated with the inside of the upper cylindrical portion 33. The lower end of the central bore 39 is fitted with an annular projection 41 of the retainer 14. Thus, a central valve chamber 42 is formed in the central bore 39. A communicating passage 53 having an L-shaped cross-sectional configuration is formed in the retainer 14. The communicating passage 53 opens at one end thereof on one side of the retainer 14 and at the other end thereof on the top of the retainer 14. The one end portion of the communicating passage 53 is closed with a stopper member 44. A first port 45 is formed in the right cylindrical portion 35. A third port 46 is formed in the left cylindrical portion 34. The first port 45 and the communicating passage 53 are communicated with each other by a vertically extending communicating passage 52. An annularly projecting first valve seat 55 is formed at the center of the wall of the retainer 14 inside the annular projection 41. A first passage 49 extends through the first valve seat 55 to provide communication between the communicating passage 53 and the central valve chamber 42. An annularly projecting second valve seat 56 is formed at the center of the lower end of the second port block 37. A second passage 51 extends through the second valve seat 56 to provide communication between the second port 47 and the central valve chamber 42. As illustrated in the figure, the first valve seat 55 and the second valve seat 56 are disposed at respective positions facing opposite to each other on the same axis, and alternately closed by a valve body 40 which is caused to perform reciprocating motion. The third port 46 and the central valve chamber 42 are communicated with each other by a third passage 50. The third passage 50 opens to the one side of the central bore 39.

FIG. 3(d) is an enlarged perspective view of a support 58 for supporting the valve body 40. As shown in FIGS. 4 and 3(d), the valve body 40 is fitted in the central bore of a ring portion 59 of the support 58. Two connecting rods 60 are secured to two opposite sides, respectively, of a vertical flange of the ring portion 59. The connecting rods 60 extend upward. Before the retainer 14 is connected, the connecting rods 60 and the ring portion 59, which constitute the support 58, are inserted into the central bore 39 of the body member 32 from the lower side such that the connecting rods 60 extend through the space between the second port block 37 and the central bore 39. A seat spring 63 is inserted into the central bore 39 from the upper side and placed on the top of the second port block 37. Upper portions of the connecting rods 60 are fitted into respective cut portions provided in the outer peripheral portion of an upper plate 61, thereby securing the connecting rods 60. Thus, the support 58 is constructed. The upper end portion of the connecting rods 60 project from the top of the upper plate 61, and the upper ends of the connecting rods 60 abut on the lower end of a movable iron core 64 (described later). The movable iron core 64 has a central hole opening on the upper end thereof, and an armature spring 65 is fitted in the central hole. The movable iron core 64 is inserted into the guide cylinder 17 of the solenoid part 12 from the lower side and reciprocatably fitted therein. The upper end of the armature spring 65 is engaged with the lower end portion of the fixed iron core 16. In a state where the solenoid part 12 and the spacer 13 are connected together, the outer small-diameter portion of the spacer 13 is fitted into the bore of the upper cylindrical portion 33 of the body part 11, thereby securing the body part 11 and the solenoid part 12. Thus, the three-port valve shown in FIG. 4 is obtained.

The armature spring 65 and the seat spring 63 act so as to push each other. Downward resilient force from the spring 65 is transmitted to the valve body 40 through the movable iron core 64 and the support 58. Upward resilient force from the seat spring 63 is transmitted to both the valve body 40 and the movable iron core 64 through the support 58. The resilient force of the armature spring 65 is set greater than the resilient force of the seat spring 63. Thus, when the solenoid 21 is deenergized, the valve body 40 is biased downwardly, as shown in the figure. As a result, the lower seal surface of the valve body 40 is placed in close contact with the first valve seat 55, while the upper seal surface of the valve body 40 is separate from the second valve seat 56. When the solenoid 21 is energized, the movable iron core 64 is pulled upwardly against the resilient force of the armature spring 65, causing the upper end of the movable iron core 64 to contact the lower end of the fixed iron core 16. Accordingly, both the support 58 and the valve body 40 are biased upwardly by the resilient force of the seat spring 63. As a result, the upper seal surface of the valve body 40 comes in close contact with the second valve seat 56, while the lower seal surface of the valve body 40 separates from the first valve seat 55. In order for the upper seal surface of the valve body 40 to come in close contact with the second valve seat 56 to surely close the second passage 51 when the solenoid 21 is energized, the stroke VS of the valve body 40 is set smaller than the stroke AS of the movable iron core 64. Regardless of the strokes VS and AS thus set, when the solenoid 21 is deenergized, the lower seal surface of the valve body 40 comes in close contact with the first valve seat 55.

SUMMARY OF THE INVENTION

The conventional three-port valve suffers from the disadvantage that when the valve body 40 is switched over from one position to another, the seal surfaces of the valve body 40 are momentarily separate from both the first and second valve seats 55 and 56, and at that moment two fluids are undesirably mixed together. More specifically, the three-port valve may be used in such a way that the first port 45 is communicated with a vacuum chamber, the third port 46 is communicated with a vacuum pump, and the second port 47 is communicated with the atmosphere. The solenoid 21 is energized to cause the upper seal surface of the valve body 40 to come in close contact with the second valve seat 56, thereby closing the second passage 51. Meanwhile, the lower seal surface of the valve body 40 separates from the first valve seat 55 to open the first passage 49. If the vacuum pump is activated under these conditions, a fluid in the vacuum chamber is sucked by the vacuum pump. Then, if the operation of the vacuum pump is suspended, and at the same time, the solenoid 21 is deenergized, the difference between the resilient forces of the springs 65 and 63 is transmitted to the valve body 40. Consequently, the upper seal surface of the valve body 40 separates from the second valve seat 56, and the valve body 40 moves toward the first valve seat 55. During a brief period of time elapsed from the instant the upper seal surface of the valve body 40 separates from the second valve seat 56 until the lower seal surface of the valve body 40 has come in close contact with the first valve seat 55, the atmospheric air flows into the central valve chamber 42 from the second port 47 through the second passage 51 and further flows to the vacuum pump through the third passage 50 and the third port 46. Moreover, the atmospheric air flows back to the vacuum chamber through the first passage 49, the communicating passages 53 and 52, and the first port 45. Thus, during the course of switching the three-port valve, the second port 47 and the first port 45 are momentarily communicated with each other, and the atmospheric air flows back to the vacuum chamber, contaminating the vacuum chamber.

An object of the present invention is to provide a three-port valve capable of switching flow paths from one to another without undesired conduction between the switched flow paths.

To attain the above-described object, the present invention provides a three-port valve of the type wherein a first valve seat and a second valve seat are disposed opposite to each other in a central valve chamber. A first passage extending through the first valve seat is communicated with a first port. A second passage extending through the second valve seat is communicated with a second port. The central valve chamber is communicated with a third port. A valve body having a first seal surface and a second seal surface is disposed between the first valve seat and the second valve seat. According to the present invention, the distance between the first and second seal surfaces of the valve body is variable. At least one of the seal surfaces of the valve body is always placed in close contact with the first valve seat or the second valve seat. When the valve body lies in the vicinity of an intermediate position at a stage in a switching operation of the valve, both the two seal surfaces of the valve body are placed in close contact with the first and second valve seats, respectively. By virtue of this arrangement, while one seal surface is keeping sealing one valve seat, the other seal surface moves, and the one seal surface begins to separate from the one valve seat after the completion of a valve closing operation in which the other seal surface seals the other valve seat.

In the above-described arrangement, a support may be engaged with a switching control member. The support has two stoppers, and the valve body is fitted between the two stoppers.

In the above-described two arrangements, it is possible to adopt an arrangement ① wherein the valve body comprises a first valve member, a second valve member, and a valve spring, which are arranged such that resilient force from the valve spring acts in a direction in which the first valve member and the second valve member come away from each other, and wherein seal surfaces are formed on respective outer sides of the first and second valve members. Alternatively, an arrangement ② may be adopted wherein the valve body comprises a single valve member which is either hollow or solid, and an elastic member is disposed between the first seal surface and the second seal surface.

In the above-described three arrangements, the valve body may assume selectively two positions. At a first position, the first seal surface is placed in close contact with the first valve seat, and the second seal surface is separate from the second valve seat. Near a middle position of the valve body, both the first seal surface and the second seal surface are momentarily placed in close contact with the first valve seat and the second valve seat, respectively. At a second position, the first seal surface separates from the first valve seat, and the second seal surface is placed in close contact with the second valve seat.

In the above-described three arrangements, the valve body may assume selectively three positions. At a first position, the first seal surface is placed in close contact with the first valve seat, and the second seal surface is separate from the second valve seat. At a second position, the first seal surface is placed in close contact with the first valve seat, and the second seal surface is placed in close contact with the second valve seat. At a third position, the first seal surface separates from the first valve seat, and the second seal surface is placed in close contact with the second valve seat.

In the above-described five arrangement, the three-port valve may be used in such a way that the first port is communicated with a vacuum chamber, while the second port is communicated with the atmosphere, and the third port is communicated with a vacuum pump.

BRIEF DESCRIPTION OF THE DRAWINGS

FIG. 2(*b*) shows the essential parts of the embodiment in a state where the valve body is in an intermediate position.

FIG. 2(*c*) shows the essential parts of the embodiment in a state where the valve body is in a lower position.

DESCRIPTION OF THE PREFERRED EMBODIMENTS

Figure 2A:
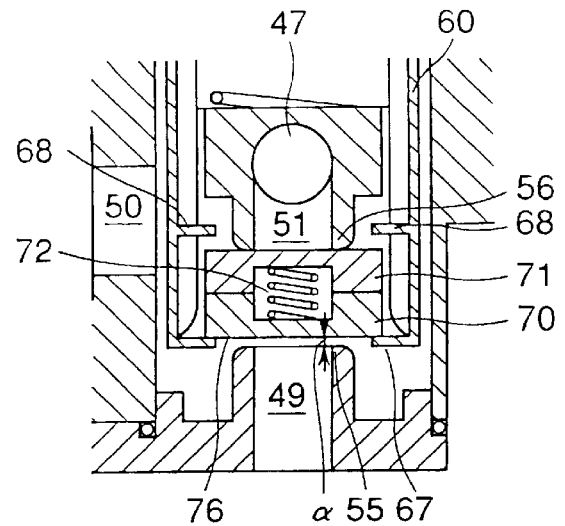
FIG. 2(*a*) shows essential parts of the embodiment in a state where a valve body is in an upper position.
Figure 2B:
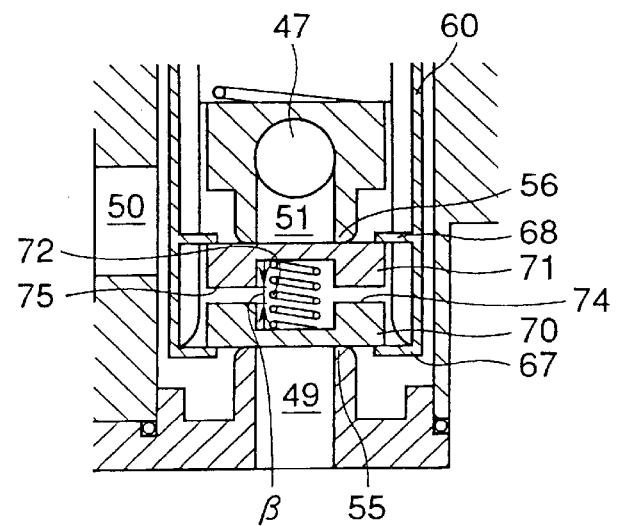
Figure 2C:
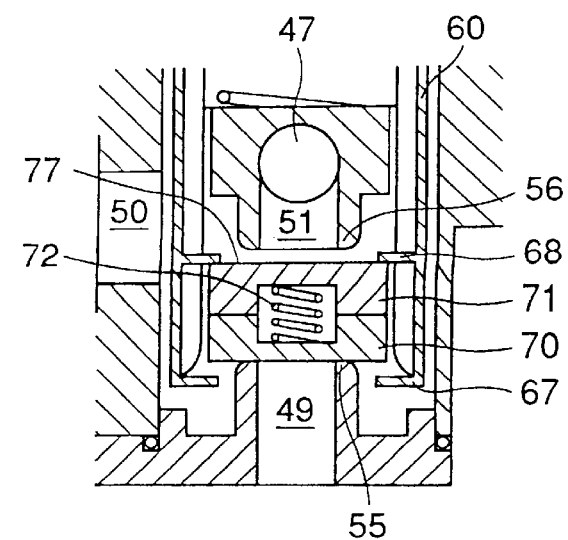
Figure 3A:
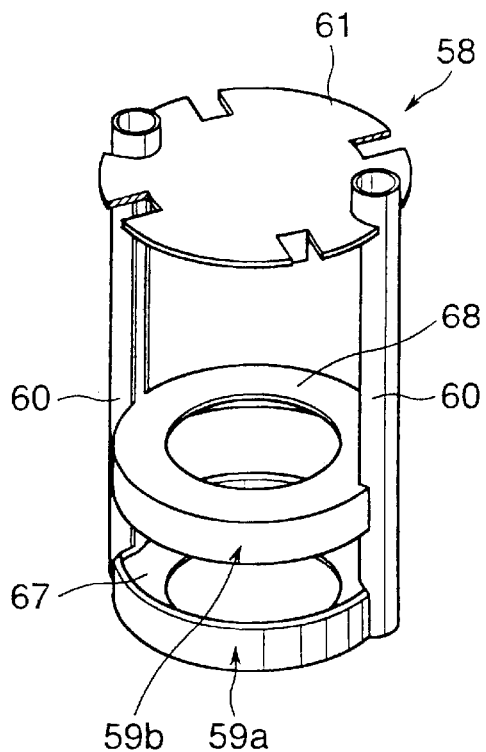
FIG. 3(*a*) is a perspective view of a support used in the embodiment of the present invention.
FIG. 3(b) is a sectional view showing a first modification of the valve body in the embodiment of the present invention.
FIG. 3(c) shows a single valve member as a second modification of the valve body in the embodiment of the present invention.
FIG. 3(d) is a perspective view of a conventional support.
Figure 3C:
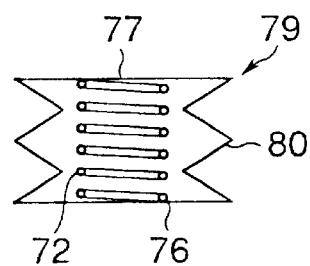

FIGS. 1 and 2(a) to 3(a) show an embodiment of the three-port valve according to the present invention. In these figures, the same members or portions as those in the prior art shown in FIGS. 4 and 3(d) are denoted by the same reference characters, and a description thereof is omitted. The embodiment of the present invention is characterized in that the valve body is divided into two parts, either of which is always placed in close contact with the first valve seat 55 or the second valve seat 56, and during the course of switching the valve, the two seal surfaces of the valve body are simultaneously placed in close contact with the first valve seat 55 and the second valve seat 56, respectively.

As shown in FIGS. 1 and 2(a) to 3(a), a first stopper 67 is secured to the lower ends of the connecting rods 60 of the support 58, and a second stopper 68 is secured to the connecting rods 60 at a position a predetermined distance above the first stopper 67. A composite valve body comprising a first valve member 70, a valve spring 72, and a second valve member 71 is fitted between the first stopper 67 and the second stopper 68. The first valve member 70 and the second valve member 71 each comprise a disk-shaped portion and an annular portion, which are integrally formed as one unit. The surfaces of the annular portions of the first and second valve members 70 and 71 form abutments 74 and 75, respectively. The abutment 74 on the inner side of the first valve member 70 and the abutment 75 on the inner side of the second valve member 71 are disposed to face each other. The valve spring 72 is fitted in opposing recesses formed inside the abutments 74 and 75. Resilient force from the valve spring 72 acts in a direction in which the first valve member 70 and the second valve member 71 come away from each other. A first seal surface 76 provided on the outer side of the first valve member 70 is disposed to face the first valve seat 55. A second seal surface 77 provided on the outer side of the second valve member 71 is disposed to face the second valve seat 56. The first seal surface 76 and the second seal surface 77 are flat surfaces, which are adapted to come in close contact with the first valve seat 55 and the second valve seat 56 to close the first passage 49 and the second passage 51, respectively.

The first stopper 67 and the second stopper 68 have the function of limiting the first seal surface 76 of the first valve member 70 and the second seal surface 77 of the second valve member 71 to predetermined positions, respectively. More specifically, when the solenoid 21 is energized and thus the first stopper 67 and the second stopper 68 are in their upper positions as shown in FIG. 2(a), the second seal surface 77 is placed in close contact with the second valve seat 56, and the first seal surface 76 is separate from the first valve seat 55. When the solenoid 21 is deenergized and thus the first stopper 67 and the second stopper 68 are in their lower positions as shown in FIG. 2(c), the first seal surface 76 is placed in close contact with the first valve seat 55, and the second seal surface 77 is separate from the second valve seat 56. When the first stopper 67 and the second stopper 68 shift from the upper positions to intermediate positions, while the second seal surface 77 is keeping sealing by closely contacting the second valve seat 56, the first seal surface 76 moves downward so as to come in close contact with the first valve seat 55. When the first stopper 67 and the second stopper 68 are in their intermediate positions between the upper and lower positions, the first seal surface 76 is placed in close contact with the first valve seat 55, and at the same time, the second seal surface 77 is placed in close contact with the second valve seat 56. Configurations of the first and second stoppers 67 and 68 are schematically shown in FIGS. 1 and 2(a) to 2(c). For example, the first and second stoppers 67 and 68 may have configurations as shown in FIG. 3(a). That is, two ring portions 59 as in the prior art are prepared and disposed to vertically face each other. The annular horizontal surface of the lower ring portion 59a serves as the first stopper 67, and the annular horizontal surface of the upper ring portion 59b serves as the second stopper 68. Connecting rods 60 that connect the first and second stoppers 67 and 68 prevent the first and second valve members 70 and 71 from coming out of their fitted positions. Therefore, it is desirable to use wide connecting rods 60.

The operation of the embodiment of the three-port valve according to the present invention will be described below.

When the solenoid 21 is energized, the movable iron core 64 is pulled upwardly against the resilient force of the armature spring 65, and the upper end of the movable iron core 64 comes in contact with the lower end of the fixed iron core 16, as described above. The support 58 is biased upwardly by the resilient force of the seat spring 63, and the first stopper 67 of the support 58 presses the first valve member 70 upwardly. The valve spring 72 is compressed, and the abutment 74 of the first valve member 70 and the abutment 75 of the second valve member 71 are brought into contact with each other. The second seal surface 77 of the second valve member 71 is placed in close contact with the second valve seat 56 to close the second passage 51. The first seal surface 76 of the first valve member 70 separates from the first valve seat 55 to open the first passage 49. The first port 45 is communicated with the third port 46 through the communicating passages 52 and 53, the first passage 49, the central valve chamber 42, and the third passage 50, while the second port 47 is closed. In a case where the three-port valve is used in such a way that the first port 45 is communicated with a vacuum chamber, while the third port 46 is communicated with a vacuum pump, and the second port 47 is communicated with the atmosphere, a fluid in the vacuum chamber is sucked by the vacuum pump through the first port 45, the central valve chamber 42, the third port 46, etc.

Figure 1:
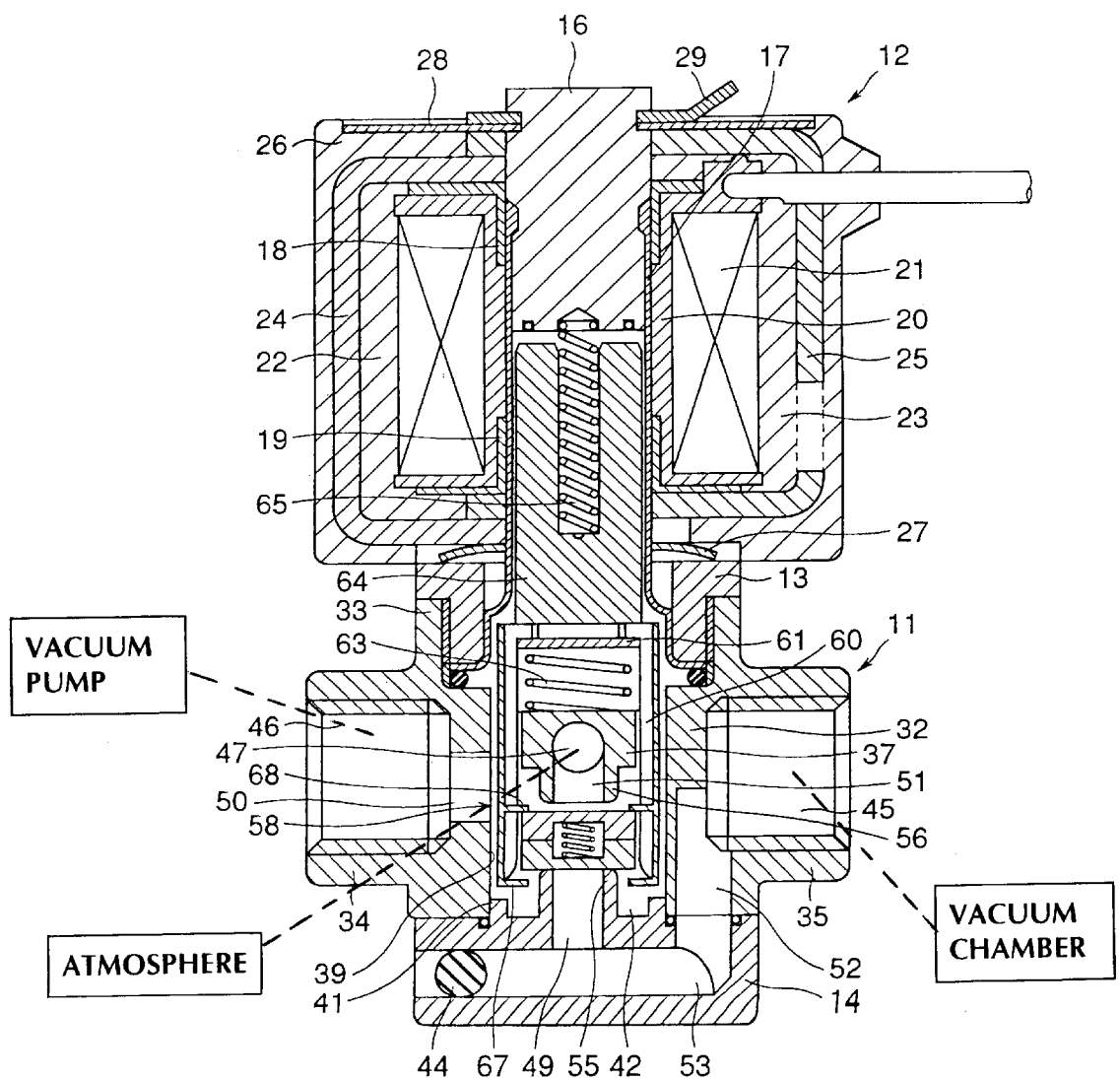
FIG. 1 is a sectional view showing an embodiment of the three-port valve according to the present invention.

When the solenoid 21 is not energized, as shown in FIGS. 1 and 2(c), the support 58 is biased downwardly by the difference between the relatively large resilient force of the armature spring 65 and the relatively small resilient force of the seat spring 63. Thus, the second stopper 68 of the support 58 presses the top of the second valve member 71 downwardly. The valve spring 72 is compressed, and the abutment 75 of the second valve member 71 and the abutment 74 of the first valve member 70 abut on each other. The first seal surface 76 of the first valve member 70 is placed in close contact with the first valve seat 55 to close the first passage 49. The second seal surface 77 of the second valve member 71 is separate from the second valve seat 56 to open the second passage 51. The second port 47 is communicated with the third port 46 through the second passage 51, the central valve chamber 42, and the third passage 50, while the first port 45 is closed. In a case where the three-port valve is used in such a way that the first port 45 is communicated with a vacuum chamber, while the third port 46 is communicated with a vacuum pump, and the second port 47 is communicated with the atmosphere, the atmospheric air is sucked by the vacuum pump through the second port 47, the second passage 51, the central valve chamber 42, the third port 46, etc. The passage to the vacuum chamber is cut off.

When the solenoid 21 changes over from an energized state to a deenergized state, the connecting rods 60 of the support 58 as shown in FIG. 2(a) begin to move downward. The distance between the first stopper 67 and the second stopper 68 is greater than the overall thickness of the first and second valve members 70 and 71 by a predetermined extent, and the stroke of the support 58 is greater than the stroke of the first and second valve members 70 and 71. Therefore, as the first stopper 67 moves downward, the first valve member 70 begins to move downward without the second valve member 71 contacting the second stopper 68. At this time, the second valve member 71 is biased upwardly by the resilient force of the valve spring 72. Thus, the second seal surface 77 of the second valve member 71 maintains the state of closely contacting the second valve seat 56. When the first stopper 67 further moves downward, a position near the middle of the stroke is reached as shown in FIG. 2(b). At this time, the second seal surface 77 of the second valve member 71 continues to be in close contact with the second valve seat 56 to close the second passage 51, and at the same time, the first seal surface 76 of the first valve member 70 is placed in close contact with the first valve seat 55 to close the first passage 49. Thus, the three ports are fully closed. In this full-closed state, all the flow paths in the body part 11 are cut off. The distance between the first stopper 67 and the second stopper 68 is set slightly greater than the distance between the first valve seat 55 and the second valve seat 56 [i.e. the distance between the first seal surface 76 and the second seal surface 77 in FIG. 2(b)] so that in the full-closed state as shown in FIG. 2(b), the first valve seat 55 and the second valve seat 56 are surely sealed by the first seal surface 76 and the second seal surface 77, respectively. The first valve member 70 and the second valve member 71 are made of an elastic material such as a synthetic rubber material. Therefore, in a state as shown in FIG. 2(a), the first and second valve members 70 and 71 are compressed, whereas, in a state as shown in FIG. 2(b), they are not compressed. Accordingly, $\alpha<\beta$ [see FIGS. 2(a) and 2(b)]. It should be noted that where the valve body is adapted to selectively assume two positions as in the case of this embodiment, FIG. 2(b) shows the support 58 in an instant of the movement thereof. The length of time that the valve body is in the full-closed state becomes longer according as the distance between the first stopper 67 and the second stopper 68 increases.

When the support 58 further moves downward from the full-closed position shown in FIG. 2(b), the second valve member 71 begins to lower as the second stopper 68 moves downward. Consequently, the second seal surface 77 of the second valve member 71 separates from the second valve seat 56, thus allowing the second passage 51 to begin opening. At this time, the first valve member 70 is biased downwardly by the resilient force of the valve spring 72. Therefore, the first seal surface 76 of the first valve member 70 maintains the state of closely contacting the first valve seat 55. The second stopper 68 further moves downward to reach a position as shown in FIG. 2(c).

During the stage of shifting from an energized state to a deenergized state, the full-closed state shown in FIG. 2(b) is inevitably reached. The conventional three-port valve shown in FIG. 4 has the disadvantage that during the stage of shifting from an energized state to a deenergized state, the fluid in the vacuum chamber is momentarily conducted to both the vacuum pump and the atmosphere through the first port 45, the central valve chamber 42, the second port 47, the third port 46, etc., as described above. In the three-port valve shown in FIGS. 1 and 2(a) to 2(c), all the flows are cut off in the state shown in FIG. 2(b), and thus the passage to the vacuum chamber is cut off. Then, the atmospheric air flows to the vacuum pump through the second port 47, the second passage 51, the central valve chamber 42, the third passage 50, and the third port 46. Accordingly, there is no likelihood of the atmospheric air flowing back to the vacuum chamber; therefore, the vacuum chamber is not contaminated. In a case where a rotary pump is used as a vacuum pump, when the rotary pump is suspended, no atmospheric air flows into the vacuum chamber, but the atmospheric air can be introduced into the rotary pump. Thus, it is possible to prevent floating of oil in the rotary pump.

In the case of shifting from a deenergized state to an energized state also, the full-closed state shown in FIG. 2(b) is inevitably reached. In the full-closed state, all the flow paths are cut off. Therefore, flow paths can be switched from one to another without undesired communication between the switched flow paths.

Figure 3B:
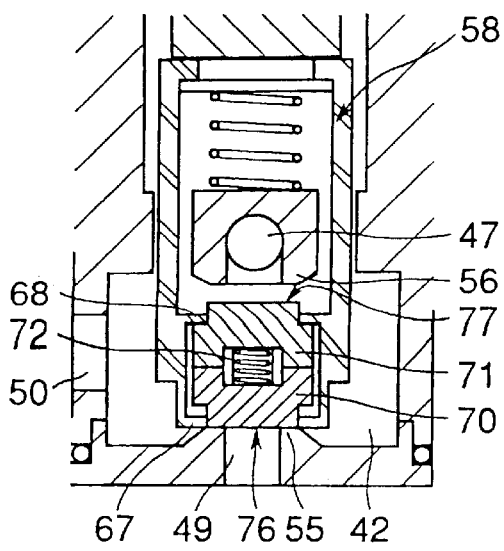
Figure 3D:
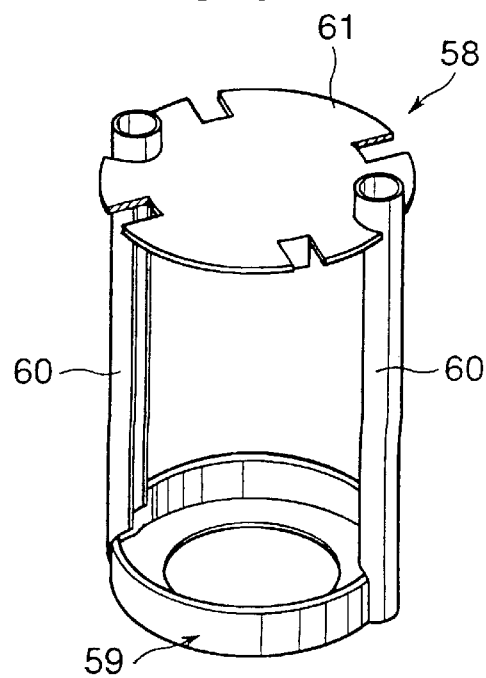
Figure 4:
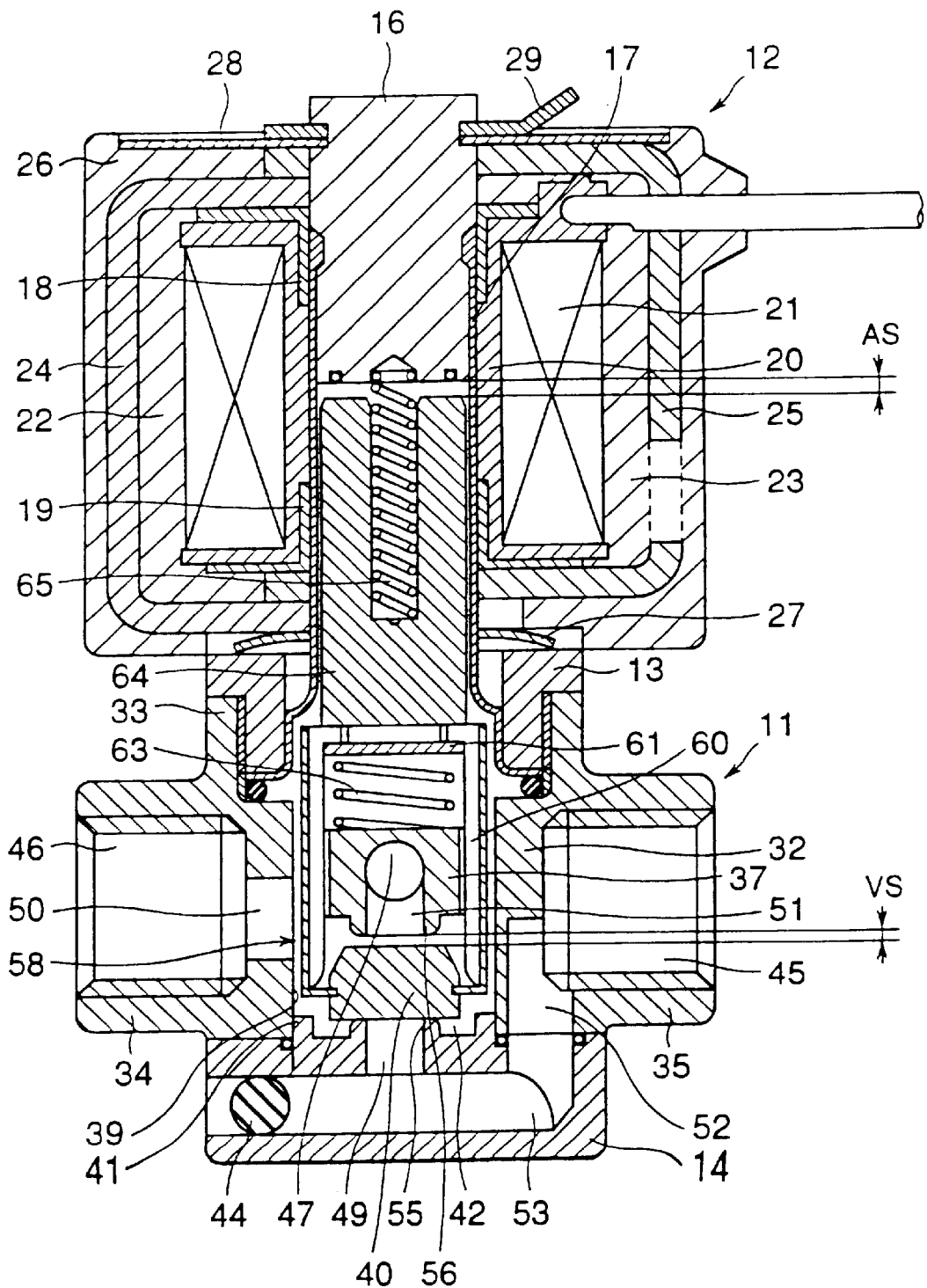
FIG. 4 is a sectional view of a conventional three-port valve.

FIG. 3(b) shows a first modification of the valve body in the embodiment of the present invention, in which the same members or portions as those in the embodiment are denoted by the same reference characters, and a description thereof is omitted. In the first modification, a step portion and a small-diameter portion are formed on the lower part of the first valve member 70, and a step portion and a small-diameter portion are similarly formed on the upper part of the second valve member 71. The small-diameter portions are contacted and thus guided by the respective inner peripheral surfaces of the first and second stoppers 67 and 68. The step portions are adapted to abut on the respective horizontal surfaces of the first and second stoppers 67 and 68 to stop.

FIG. 3(c) shows a single valve member 79 as a second modification of the valve body in the embodiment of the present invention. In the second modification, a flat plate-shaped first seal surface 76 and second seal surface 77 are connected by a bellows-shaped elastic member 80, thereby forming a hollow single valve member 79 having air sealed therein. A valve spring 72 is disposed in the single valve member 79. Resilient force from the valve spring 72 and pneumatic pressure act on the first seal surface 76 and the second seal surface 77 in a direction in which the two seal surfaces 76 and 77 come away from each other. The configuration of the single valve member 79 is not necessarily restricted to that shown in the figure. The single valve member 79 may have any configuration, provided that it has a first seal surface 76 and a second seal surface 77, and force acts in a direction in which the first and second seal surfaces 76 and 77 come away from each other. For example, the single valve member may be formed by using a spherical hollow elastic member arranged such that the upper and lower spherical surfaces of the elastic member serve as a first seal surface 76 and a second seal surface 77, respectively, and the pressure of air sealed in the spherical hollow elastic member acts in a direction in which the first and second seal surfaces 76 and 77 come away from each other. It is also possible to use a spherical solid elastic member arranged such that elastic force from the elastic member acts in a direction in which the first seal surface 76 and the second seal surface 77 come away from each other.

Although a two-position, three-port solenoid valve is shown in FIG. 1, it is possible for those skilled in the art without a need of thinking power to form a three-position, three-port solenoid valve by replacing the solenoid part 12 with a solenoid part for a three-position solenoid valve. In the case of a three-position, three-port solenoid valve, the valve body can be surely stopped at three positions as shown in FIGS. 2(a), 2(b) and 2(c). It is also possible to form a three-position, three-port valve which is activated by a mechanical operation or a pilot operation, not by an electromagnetic operation.

According to the present invention, a three-port valve is arranged such that the distance between a first and second seal surfaces of a valve body is variable, and at least one of the seal surfaces of the valve body is always placed in close contact with a first valve seat or a second valve seat, and that at a stage in a switching operation of the valve, the two seal surfaces of the valve body are simultaneously placed in the first and second valve seats, respectively. Accordingly, the three-port valve can switch flow paths from one to another without undesired communication (contact) between the switched flow paths.

What is claimed is:

1. A three-port valve comprising a body having walls defining a valve chamber;

a first annular projecting valve seat and a second annular projecting valve seat on the valve body, the valve seats being disposed opposite each other on the walls defining the chamber and spaced apart from each other;

a first passage in the body extending from the chamber through the first valve seat to a first port in the body;

a second passage in the body extending from the chamber through the second valve seat to a second port in the body;

a third passage in the valve body extending from the chamber to a third port in the body;

a first substantially rigid elastic sealing member received in the chamber and selectively movable into engagement with the first valve seat, the first sealing member having a disk-like portion having a flat face engageable with the first valve seat and an annular flange portion integral with the disk-like portion and defining a cavity opening in a direction away from the first valve seat;

a second substantially rigid elastic sealing member received in the chamber and selectively movable into engagement with the second valve seat, the second sealing member having a disk-like portion having a flat sealing face engageable with the second valve seat and an annular flange portion integral with the disk-like portion and defining a cavity opening in a direction away from the second valve seat;

a compression spring having portions received in the cavities of the first and second members and biasing the sealing members away from each other; and a movable hollow valve support cage carrying the seal members and having a first fixed annular stopper flange selectively engageable with the disk-like portion of the first sealing member outwardly of the sealing face, a second fixed annular stopper flange selectively engageable with the disk-like portion of the second sealing member outwardly of the sealing face, the valve support cage being movable by a switching control member between a first position in which the first stopper flange engages the first sealing member and holds the first sealing member out of engagement with the first valve seat and in which the second stopper flange is disengaged from the second sealing member and the second sealing member engages the second valve seat and a second position in which the second stopper flange engages the second sealing member and holds the second sealing member out of engagement with the second valve seat and in which the first stopper flange is disengaged from the first sealing member and the first sealing member engages the first valve seat, the stopper flanges being located relative to the sealing members such that in all positions of the valve support cage between the first and second positions the first and second sealing members are engaged with the respective first and second valve seats by the compression spring.

2. A three-port valve according to claim 1 wherein the disk-like portion of each of the sealing members has a reduced diameter peripheral wall portion and a shoulder adjacent the reduced diameter portion, and the respective stopper flanges are in sliding relation to the smaller diameter wall portions such as to guide the sealing members and are engageable with the shoulders.

3. A three-port valve according to claim 2 wherein the annular flange portions of the sealing members have end surfaces forming abutments that face each other and engage each other when the valve support cage is in the first position or in the second position.

4. A three-port valve according to claim 1 wherein the annular flange portions of the sealing members have end surfaces forming abutments that face each other and engage each other when the valve support cage is in the first position or in the second position.

5. A three-port valve according to claim 1, wherein the first port is communicated with a vacuum chamber, the second port is communicated with the atmosphere, and the third port is communicated with a vacuum pump.

* * * * *